(12) United States Patent
Statnikov

(10) Patent No.: US 6,338,765 B1
(45) Date of Patent: Jan. 15, 2002

(54) ULTRASONIC IMPACT METHODS FOR TREATMENT OF WELDED STRUCTURES

(75) Inventor: Efim S. Statnikov, Severodvinsk (RU)

(73) Assignee: UIT, L.L.C., Birmingham, AL (US)

( * ) Notice: Subject to any disclaimer, the term of this patent is extended or adjusted under 35 U.S.C. 154(b) by 0 days.

(21) Appl. No.: 09/288,020

(22) Filed: Apr. 8, 1999

Related U.S. Application Data

(63) Continuation-in-part of application No. 09/145,992, filed on Sep. 3, 1998, now Pat. No. 6,171,415.

(51) Int. Cl.$^7$ .................. B23Q 17/00; G01M 19/00
(52) U.S. Cl. ............... 148/558; 148/508; 148/509; 148/510; 29/407.07; 116/137 A
(58) Field of Search .............. 148/508–511, 516, 148/558; 29/407.07; 116/137 A

(56) References Cited

U.S. PATENT DOCUMENTS

| | | | | |
|---|---|---|---|---|
| 3,274,033 A | * | 9/1966 | Jacke .................. | 148/558 |
| 4,823,599 A | * | 4/1989 | Schneider ............. | 148/558 |
| 4,968,359 A | * | 11/1990 | Hebel et al. .......... | 148/558 |
| 5,035,142 A | * | 7/1991 | Dryga et al. .......... | 148/558 |
| 5,242,512 A | * | 9/1993 | Bagley et al. ......... | 148/558 |
| 5,286,313 A | * | 2/1994 | Schultz et al. ........ | 148/508 |

\* cited by examiner

*Primary Examiner*—George Wyszomierski
(74) *Attorney, Agent, or Firm*—Breiner & Breiner, L.L.C.

(57) ABSTRACT

This invention provides methods of treatment for work products of materials such as steel, bronze, plastic, etc. and particularly welded steel bodies by pulse impact energy, preferably ultrasonic, to relax fatigue and aging and extend expectant life. The treatment may occur (a) at original production, (b) during the active life period for maintenance or (c) after failure in a repair stage. The ultrasonic treatment improves the work product strength. In welded products residual stress patterns near the weld sites are relaxed and micro-stress defects such as voids and unusual grain boundaries are reduced. The basic method steps are nondestructive in nature, inducing interior pulse compression waves with ultrasonic transducers and accessory tools impacting an external product surface with enough impulse energy to heat and temporarily plasticize the metal interior and relax stresses. The nature of the work product interior structure being treated is determined by sensing the mechanical movement at the impact surface of the work body to produce feedback frequency and phase signals responsive to input impact signals. These signals automatically conform driving pulse energy frequency and phase to the input transducers to match the mechanical resonance frequency of the working transducers and increase efficiency of energy transfer. Such feedback signals also are available for automated procedures which can improve product quality and consistency.

37 Claims, 4 Drawing Sheets

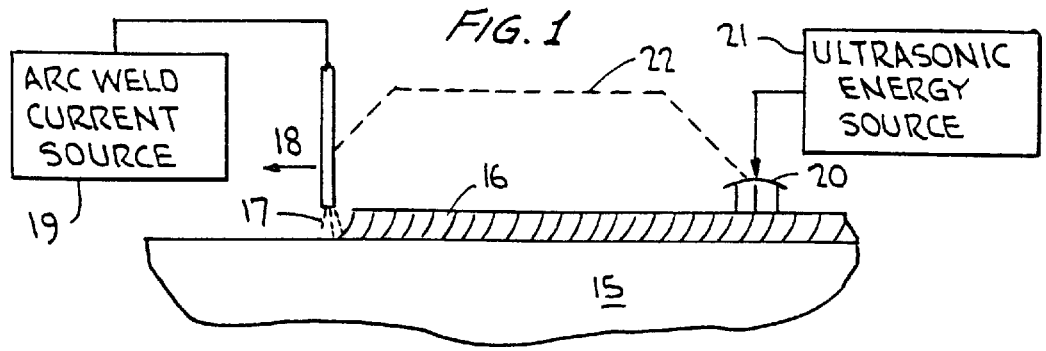
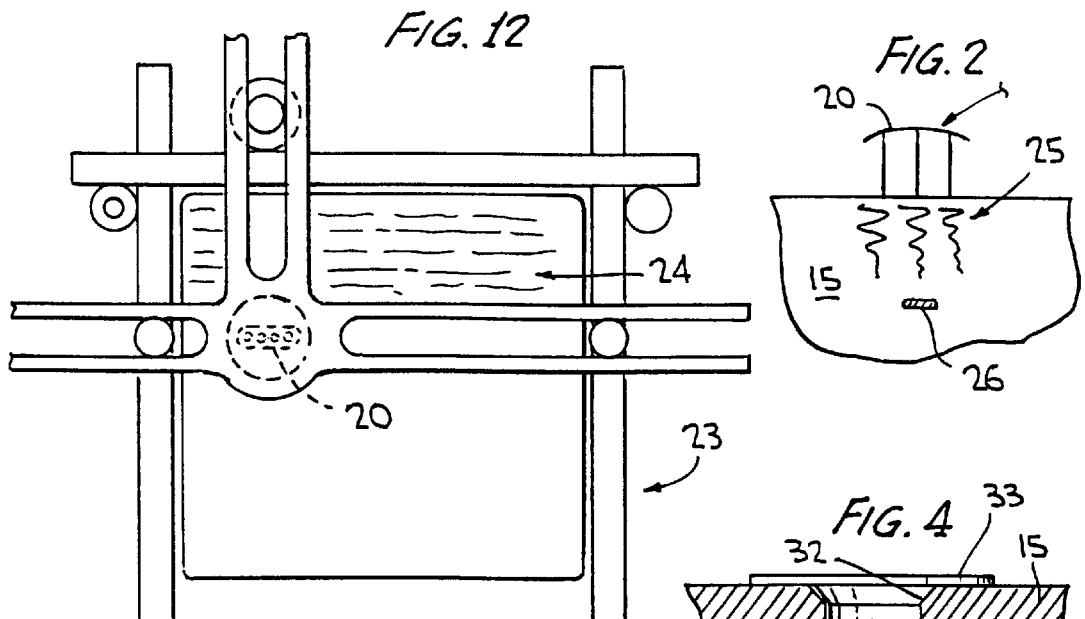
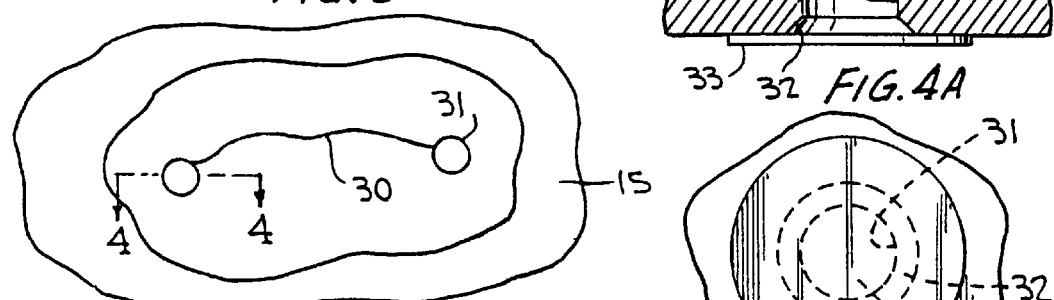
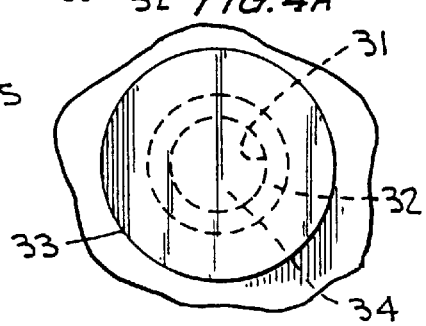
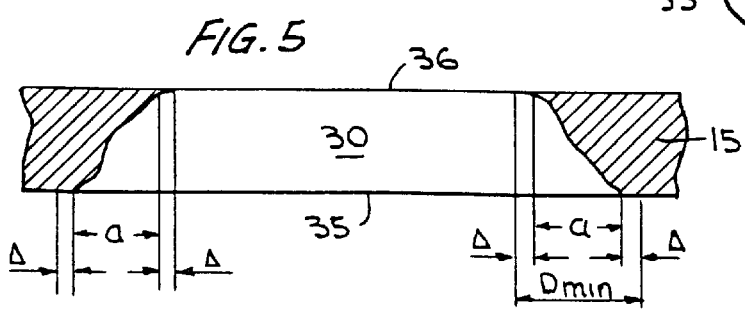

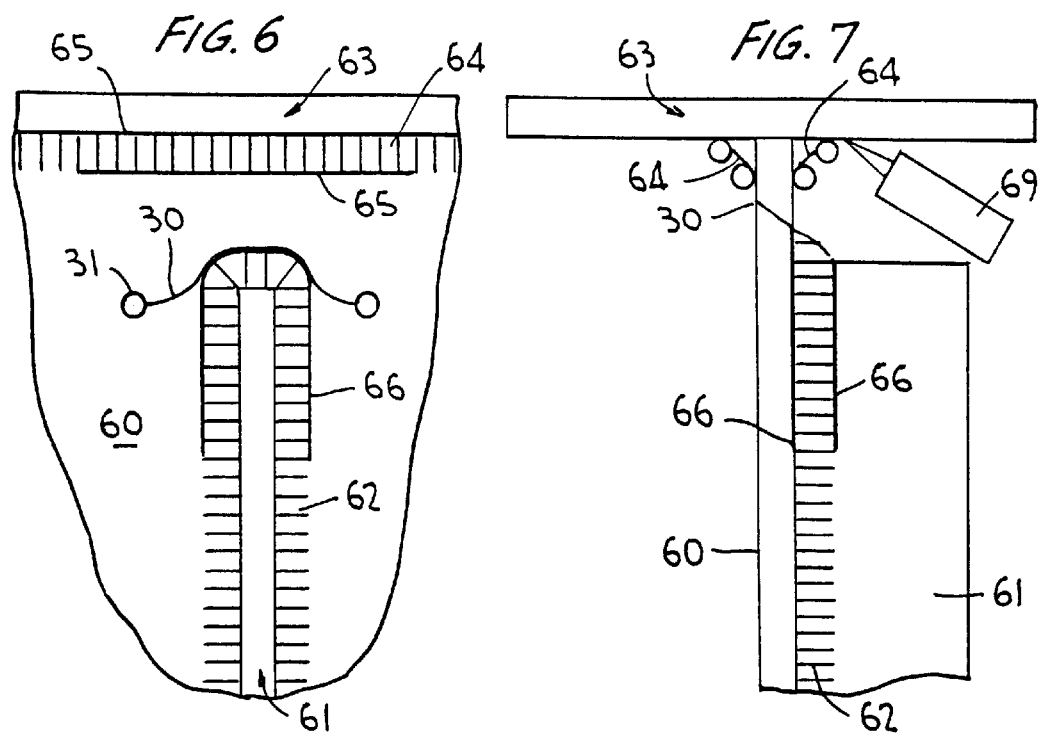
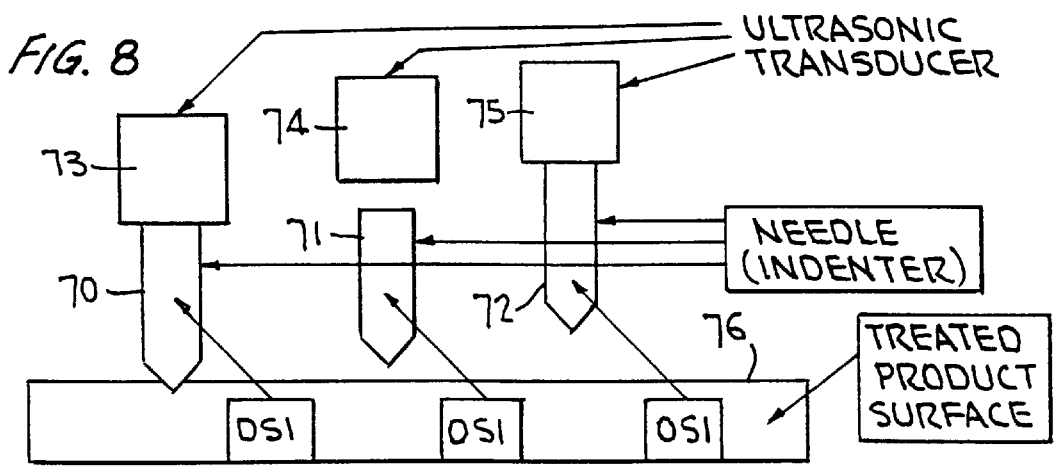
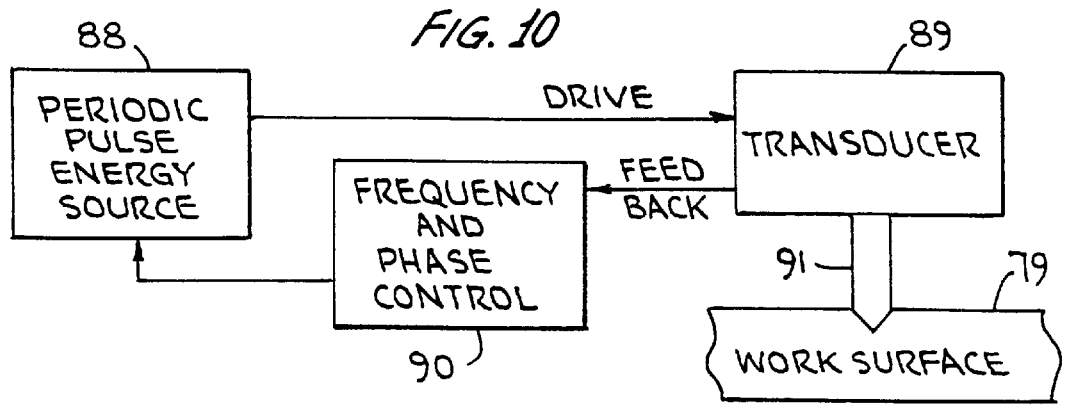

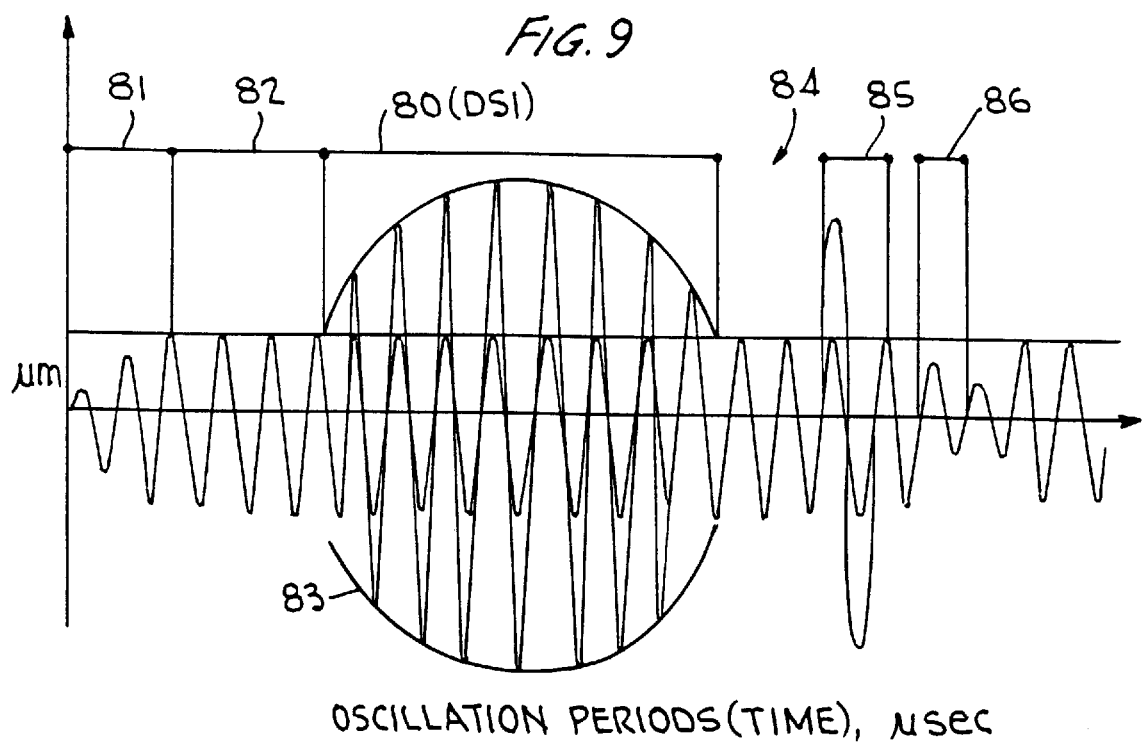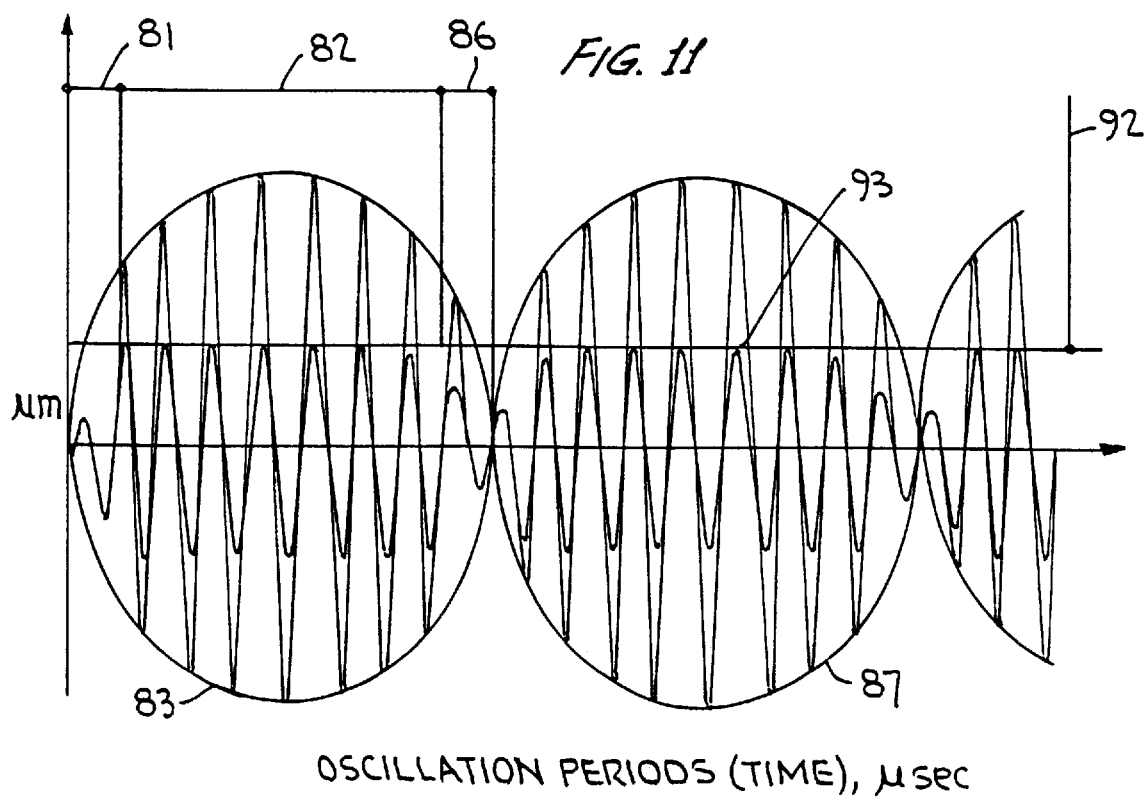

PULSED POWER SOURCE

US 6,338,765 B1

ULTRASONIC IMPACT METHODS FOR TREATMENT OF WELDED STRUCTURES

This is a continuation-in-part of the application for Ultrasonic Welding Method and Apparatus, Ser. No. 09/145,992 filed Sep. 3, 1998, now U.S. Pat. No. 6,171,415.

TECHNICAL FIELD

This invention relates to methods, apparatus and systems utilizing and benefitting from the energy of pulses, oscillations and impacts on an exterior surface of a solid work product to rearrange the interior product structure, typically by accompanying plastic deformation. Thus, ultrasonic energy is employed for treatment of metallic and plastic bodies with and without welds. Typically bodies of ferromagnetic metal structures are treated on exterior surfaces. More particularly this invention relates to reduction, elimination, redistribution, relaxation of tensile stresses and defective structures such as voids and grain structures weakening the internal body structure including residual welding stresses. Defects tending to cause structural fatigue and failures in metallic structures and welded products are thus treated by the impact of ultrasonic energy applied to the work product external surfaces. Work products, typically product structures and welded products, are nondestructively impacted at exterior surfaces in the vicinity of welding joints when present, e.g. at welding toes, and/or to non-welded surfaces to thereby restructure the work product internal stresses to impart longer life and greater weight bearing strength.

BACKGROUND ART

In the metal forming and welding arts, the initial manufacturing process, the after-manufacture treatment of the product, the encountering of and the magnitude of loads in use and the aging process lead to deterioration of load bearing strength in the product structure, whether unseen without destructive analysis or evidenced by catastrophic failure, such as by appearance of fractures or cracks.

Conventional welded products are made by employment of various welding art technological operation steps before and after the actual welding step in an attempt to improve the working life of the products. Some of these technological operation steps are categorized as: (a) pre-welding preparation of exposed surfaces at welding sites by abrasive or chemical cleaning, (b) post-welding processing of welded seams by cleaning flux and slag and by surface shaping to remove visible sharp projections and contours that identify concentrated stress areas, (c) surface treatment of the welded structure with corrosion resisting coatings, (d) thermal tempering for relaxation of residual stresses and for internally restructuring the metal grain in a manner reducing the influence of stress concentrations, and (e) demagnetizing treatment to protect welding arcs from magnetic interferences during multi-pass welding operations.

There are interactions of the various independent steps typically occurring at various times on metal products, particularly in view of various intricate work product shapes and loading patterns, and the difficulties in detecting defective subsurface base material patterns, such as grain structure and residual stresses in the product that affect fatigue, life and strength, particularly in the presence of stress concentration zones and highly loaded working zones. Thus, efforts in combatting long term fatigue initiated both during initial manufacture and during useful life with various technical operations heretofore available in the prior art have been substantially limited in their effectiveness and/or are unpredictable, thus producing compromised product quality inconsistent with expected and desired performance.

Known vibration and pulsed methods of stress relief include inducing low frequency mechanical vibrations into products such as welded structures to reduce residual stresses, and employing pulsed magnetic fields to relieve stress in ferromagnetic cutting tools.

At this stage of the prior art, a number and variety of interacting technical operations in a series of processing steps in initial production are required to fabricate proper welded metal products with greater load bearing capacity and lower internal residual stresses for longer expected life and higher quality. Simplification and lower cost of the production process as well as improved performance is thus highly desirable.

Welded metal product or structure manufacturing and repair practices require the addition of and/or removal of materials which therefore are consumed in the manufacturing process. For example, overlay welding and beading operations for strengthening weld seams require more initial product metal and require additional technical operations such as mechanical grinding, removal of fluxes and residues, thermal tempering and cosmetic shaping. It has not been feasible to obtain optimum appearance, strength and life in welded products without such steps. On the other hand, such steps increase costs of production and result in more complex fabrication process.

It is conventional to retire and replace aging metal structures such as steel bridgework and load bearing products subject to aging, which encounter stress fatigue corrosion, undesirable internal stress patterns, and the like, causing the presence of either unseen internal damage or observable surface defects. It is therefore desirable to provide improved maintenance and repair technology to extend the useful work product life by restoring or improving initial load bearing strength and reducing residual stresses in maintenance procedures so that current structures may be kept in operation.

In the welding structure arts conventionally in practice, practical technology has not been available which is well adapted for in-use non-destructive and non-deforming repairs to restructure and restore welded products that have become structurally unsound from aging, that have reduced loading capacity because of fatigue and residual stresses, or which have catastrophically failed by cracking, or the like.

For example, the prior art ability to repair visible catastrophic failures of structure, evidenced by cracks or fractures, in most part is limited to the addition of supporting braces, crutches, and other types of overlying structure to bypass damaged zones. Such techniques are not suitable for many metallic structure installations where there is either no accessible place to rework the welded products in-situ, where restrictions in space are imposed or where appearance of such bypassing structure is intolerable such as in bridgework and building structural support infrastructure.

One zone subject to residual stresses which may cause early failure is the junction zone between basic metal material and weld seams that may contain residual grain or stress patterns formed in the welding process. There are prior art techniques for annealing to redistribute and relax the stress patterns. However in general this is not a scientific method but an art dependent upon skills and experience of a few artisans, such as blacksmiths, where access to the work product is available. Such artistic methods have been applied for example in tempering knives or swords. One significant reason that such methods have not been replaced by scientific technology is that the nature of internal structure is difficult to ascertain and stress concentrations are of a diverse nature that defy analysis.

Thus, a serious deficiency with the manufacture and repair of structural and load bearing products is the lack of non-destructive detectors and corresponding automated systems that can both sense the nature of internal defects and correct them in diverse kinds of internal work product structure by restoring structural integrity to produce longer life following original manufacture procedures or renewed life imparted in maintenance procedures that overcome fatigue and internal stress patterns reducing product performance.

Accordingly, a specific objective of this invention is the introduction of novel procedures for sensing the nature of interior body grain and stress patterns, which is particularly important when involving metallic and ferromagnetic product lines either with or without welding seams.

Also detection of internal product structural conditions provides a frontier for novel automation procedures for radically improving the initial manufacturing phase of metallic or plastic bodies which are subjected to mechanical and thermal stresses in use.

Accordingly it is an objective of the present invention to correct such foregoing disadvantages of the prior art and to introduce production, maintenance and repair technology which can produce work products having idealized internal structure with improved load and wear capacity by elimination of residual stresses, voids and inferior grain structures that reduce product life.

Examples of typical prior art technology related to this invention or teaching some of the elementary underlying methodology now are briefly set forth, which in the present invention are interactively combined to produce novel combinations of technologies as a whole.

Overlay technology exists, such as filler welds and overlay welds, wherein strengthening elements are superimposed over critical zones to bypass fatigued, fractured or other deficient welded product structure. The overlay may be superimposed directly upon weld seams in some cases. Typical examples of this technology are U.S. Pat. No. 2,537,533, G. E. Ingalls, Jan. 9, 1951; U.S. Pat. No. RE 16,599 R. Mattice, Apr. 19, 1927; U.S. Pat. No. 1,703,111, S. J. Kniatt, Feb. 26, 1929; and U.S. Pat. No. 1,770,932, A. G. Leake, Jul. 22, 1930. Such overlay structure in U.S. Pat. No. 4,049,186 R. E. Hanneman, et al., Sep. 20, 1977 and U.S. Pat. No. 4,624,402, D. Pitcairn, et al., Nov. 25, 1986 in particular disclose overlay welds for the purpose of preventing stress corrosion failures in the welded body.

Peening by means of pellets, hammers, stress waves and ultrasonic impact is known to surface treat and deform the welded body surface structure for contouring weld sites to induce plastic deformation producing beneficial effects and heating of the metal for thermal tempering effects. Typical art of this nature includes U.S. Pat. No. 5,654,992, K. Uraki, et al., Aug. 5, 1997 and U.S. Pat. No. 3,961,739, B. P. Leftheris, Jun. 8, 1976. These disclosures recognize that mechanical pressure and stress waves applied to the external surface of a body creates thermal energy and a momentary state of plasticity in the workpiece.

In U.S. Pat. No. 4,330,699, N. M. Farrow, May 18, 1982, a non-contact laser welder is accompanied by a second amplitude modulated laser for generating acoustic waves in the melt to improve interdiffusion and homogeneity of the weld joint.

I have authored or co-authored several publications relating to ultrasonic impact treatment of welded joints and the relationship to fatigue resistance, typically as reported in the following International Institute of Welding IIW Documents:

Publication XIII-1617-96 for example discloses that the fatigue strength of as-welded joints was increased by changes in mechanical properties of material in surface layers induced by ultrasonic impact treatment (UIT). Thus, the material at the weld toe is compressed and deformed by manual indentation using an ultrasonic probe to form indented groove structure smooth and free from irregularities. This technique depends upon the training and skills of an operator manually wielding an ultrasonic probe to form the grooves, and requires reshaping of the weld site.

The comparison of peening with (UIT) is discussed in Document XIII-1668-97, which sets forth the advantages of ultrasonic impact treatment technology over peening, and the practicability of UIT technology to compress and indent the welded body structure in the vicinity of the weld seam.

The use of ultrasonic hand tools for achieving foregoing compression indentations is set forth in Document XIII-1609-95.

These techniques have demonstrated significant increases in fatigue limits of welded structures. However, this prior art technology requires physical distortion of the welded product or structure, and demands skilled labor to make decisions on the nature of indentations in the presence of different physical shapes of welded bodies and different loading requirements at the weld sites. Thus, it is neither practical nor economically feasible to apply the techniques universally or by automation to welded products of various sorts. Furthermore there can be no consistency from one product to another to assure constant quality performance expectations. Nor can techniques provided for initial welding production cycles only, be used for later maintenance of welded products or for repairs of cracks and other catastrophic failures.

The present invention has the objectives of curing deficiencies in the aforementioned type of prior art, and offering significant advantages in simplifying processing steps while guaranteeing higher quality products and improving useful life span and higher loading capacities of welded products at various stages of life, throughout the initial production of the product and even after catastrophic failures appear, such as visually observable cracks.

A significant objective of the invention is to coordinate and combine non-destructive ultrasonic impact treatment of work product bodies without deforming their shape in a procedure applicable to manufacturing, maintenance and repair processes, typically to relax internal stresses, reverse fatigue effects, improve corrosion fatigue strength and durability of load bearing surfaces and joints, and to create relaxed more ideally distributed internal body stress patterns.

It is a specific objective of the invention to introduce improved welding technology for improving product life spans, maintaining the products during useful life and repairing defects found in products to restore useful life.

Another objective of the invention is to reduce material consumption during welding while reducing the processing time and increasing the performance and life of welded products by replacing or eliminating various required technical operation steps required in the prior art in the production, maintenance and repair of welded products, such as grinding and surface shaping steps.

A further objective of the invention is to produce quality welded joints with consistently controlled stress distribution patterns, which may constitute either initially formed structure during manufacture or redistributed structure and stress patterns initiated during service life.

It is an objective of this invention to introduce life extension methods applicable to welded structural members to substantially increase useful lives and working strengths of the welded products in a manner not heretofore feasible.

It is a further object of the invention to develop scientific methods of treating bodies of metal, plastic and composite materials in a scientifically reproducible manner based upon detected dynamic internal body conditions exhibited during treatment procedures.

SUMMARY OF THE INVENTION

Reduction and redistribution of internal stress patterns in work product bodies during manufacture, maintenance and repair, as exemplified for example by treatments of metallic work bodies in the vicinity of weld seams, are achievements of this invention serving to improve service life and load carrying capacity.

The scientific methodology of this invention is achieved in preferred embodiments by improvements in ultrasonic impact technology (UIT) for inducing shock pulses into work products through a transducer (impact tool) in contact with an exterior body surface. More generally, a shock pulse impacts the work body exterior surface by contact with an impact tool transducer to interact in one of the following modes:

(a) To transfer a single impact from a pulse energy source delivered through the transducer into the work body;

(b) To transfer a series of non-periodic impacts into the an work body;

(c) To transfer a periodic train of forced periodic vibrations into the work body; or (d) To transfer controlled trains of periodic vibrations into the work body as a function of the dynamic conditions of the work body during treatment.

The transducer and its manner of transferring to shock pulse impacts to penetrate the work body structure is a critical tool for generating the necessary amount of internal shock wave energy in the work body, typically steel, to achieve variations of internal body structure, such as restructuring residual stress patterns, temporarily plasticizing the body structure and leaving an improved permanent residual historical change of internal work body structure. This transducer must effectively convert pulse energy from a power source into internal shock waves in the work product body being treated.

One objective of this invention is to introduce pulse wave energy into load bearing work body's interior structure in such magnitude as to improve the grain structure and the residual stress patterns for producing longer wear and increased load bearing capacity. This requires efficient interchange of energy from an impact pulse source to the interior work body structure. It is selectively desirable to either deform and to avoid deformation of the impact exterior body surface. This can be achieved by different transducer structure.

Typically a surface contact member such as an indenter tool peen or needle is mechanically driven into the surface with a peening function from a mechanically movable transducer body responsive to the available pulse energy derived from a power source in one of the above described modes.

Three basic impact methods can be employed for moving the indenter tool into the work body surface, namely:

(a) one sided contact between one or a set of needle indenters and the treated product surface to drive the needle away from contact with an output working butt of a transducer into the surface being treated for an impulse stroke to spring back to the working butt ready for another stroke;

(b) one sided contact between the needle(s) and the treated product surface awaiting the output impact from the working butt of the transducer;

(c) double sided contact of the needle (s) with both the transducer working butt and the treated product surface; and (d) Any of the above with a waveguide structure inserted between the transducer working butt inclined toward a treatment position on the product surface to direct the impact energy at an angle or to reach limited access working surfaces.

By selection of these tool combinations significantly increased efficiency of energy impulse transfer into the working body may be achieved.

In any of these impact interactions between a transducer, an indenter and a treated surface, pulsed forces initiated by the UIT process leads to the following factors on the treated body when stroking impulses of appropriate stroke magnitudes and energy content are used:

(a) plastic deformation on the treated work body surface and its internal body volume, typically with penetrations up to 3 mm in steel;

(b) residual compression stresses created equal to or higher than the maximum yield of the treated material in the plastic deformation zone;

(c) residual compression stresses historically stored in the area of elastic deformation, typically up to 5 mm depth in steel;

(d) pulsed compression stresses induced, typically at a depth up to 5 mm from the treated surface;

(e) periodic waves of ultrasonic dynamic stresses induced typically to depths of 12 mm under treated surfaces.

All five effects are initiated by the plastic deformation step (a)

The effects of these UIT factors on the treated body include plastic deformations, residual compression stresses in plastic deformation zones and residual compression stresses in elastic deformation zones leading to redistribution of residual (primarily tensile) stresses, together with reduction of external dynamic and primary tensile stresses.

Both compression stress pulses and dynamic stress waves induced by UIT lead to relaxation of residual internal stresses and external dynamic stresses, sometimes resulting in internal temporary plasticity.

Plastic deformations on and under treated exterior work product surfaces, in combination with redistribution and relaxation of stresses leads to increases in resistance to deformation of body material, aging, fatigue and reductions in various structural defects through the life of a body.

Improved internal work body structure is thus achieved by controlled periodic pulsed energy impact treatment of external work body surface zones, usually nondestructively, to induce internal compression waves resulting in modified internal body material structure, and plastic deformation. One useful embodiment addresses the internal body structure of a welded work product in the vicinity of the weld seam. By introduction of impulse impacts, such as ultrasonic waves of appropriate magnitude and frequency for the work product material being processed, residual stresses are relaxed in depths typically up to 12 mm (for steel). In some instances, depending on UIT parameters, the desirable "white layer" effect is created.

White layers are formed on the treated body surface and in a narrow under-surface layer, typically one micron thick by interaction of several factors, including:

(a) rapid heating to appropriate temperatures, such as close to annealing temperatures for steel, at the point of ultrasonic impact, as generated by the high repetitive frequency of the impact pulses;

(b) high intensity ultrasonic impact rate inducing plastic deformation with corresponding formation of residual stresses, typically greater than two times maximum yield; and (c) rapid thermal dissipation from the point of ultrasonic impact at a rate comparable in steel to the cooling rate of steel after annealing.

These factors are achieved by regulation of the frequency and energy of impact and the magnitude of contact stress.

"White layers" are characterized by substantial absence of evident grain structure in the vicinity of weld seams. It is well known that this amorphous crystalline structure of the "white layers" forms new grain borders providing fewer internal bubbles or vacancies of material, and dislocations of grain boundaries. The grain boundaries are moved to the borders of the white layer zones. White layers are characterized by higher fatigue resistance and corrosion resistance. The load carrying ability of the white layer structure with redistributed residual stresses thus create higher load bearing strength.

Applied pulsed energy of a random or periodic nature to an external work product surface thus creates compression waves within the work body being treated to dynamically induce a plasticized zone inside the body. Such compression waves achieve a pattern with a gradient stress magnitude pattern extending from the maximum magnitude surface zone receiving the pulsed energy and tapers to reduced magnitudes reaching to an internal unstressed base metal site within the product body. By withdrawal of the pulsed energy, rapid thermal dissipation within the body structure in an annealing manner reorganizes residual stress patterns which reduce overall product load bearing capabilities and introduce zones susceptible to failure and fatigue. For optimum effectiveness the impact treatment is preferably ultrasonically induced under the controlled conditions hereinafter described.

This treatment procedure replaces several technical operation steps required in the prior art initial production stage that simplifies and lowers costs of the treatment of work products, including welded bodies, while improving strength and life expectancy. In welded products the amount of required metal consumption is reduced significantly. Application of pulsed impact energy replaces formerly required such technological operations as: thermal treatment steps including annealing (generally requiring a furnace); overlaying auxiliary welds such as filler welds to increase the loading capacity of a weld joint; mechanical steps of chamfering weld seams to relax internal stresses; peening by hammer peening, needle peening, shot peening, and shot blasting; TIG dressing; abrasive treatment; demagnetizing; attachment of bracing plates; and the like.

Novel process steps and improved welded structures afforded by this invention for treating welded products are illustrated in one preferred embodiment related to the particular technological operation of repair of a crack in a welded body.

In general, this invention corrects prior art deficiencies by reworking the internal micro structure of work product materials in various phases of production, maintenance and repair to relax and redistribute residual structural stress patterns caused by welding in the vicinity of weld seams. Critical stress patterns or concentrations that reduce life and load bearing capabilities of the product are thus eliminated or minimized. By the application of the ultrasonic impact technology afforded by this invention, several predecessor prior art technical operations are eliminated, thus serving to improve the load bearing capabilities of the welded product more simply. Reorganization of residual stress patterns that lead to fatigue, stress corrosion and catastrophic failure improves the work product performance.

This invention provides novel methods not heretofore available in the art to prevent and repair micro structure damage usually encountered during prior art fabrication of new structures. It provides maintenance routines for increasing expected life and renovating fatigue and aging stress patterns. Also, these methods are employed in the repair of visible loading and aging defects encountered in service.

Further novel repair methods are introduced without the high processing costs to effectively eliminate failures and defects due to stress concentration introduced in prior art during sequentially applied technical operations such as stripping and shaping of surfaces, or additional beading and strain hardening procedures such as bending and thermal treatment, all of which require taking the product out of active service.

By the technology of this invention therefore novel work product structures introduced in manufacturing and maintenance procedures are introduced which produces greater load bearing capacity by reducing internal stress patterns. This leads to reduced fatigue failure and longer working life of work products.

Improved instrumentation, treatment methods, products and systems are introduced which produce and exhibit improved internal work product body structure with fewer voids and better internal stress patterns resulting in fewer defective products, service failures and early fatigue in active service. This technology is exhibited in specialty utility embodiments related to the welding arts and weight bearing structural configurations.

First the novel scientific principles employed by this invention are exemplified in the method of treatment of products to reduce internal structural defects that cause premature failure in service.

Thus, interior compressive mechanical vibrations are generally nondestructively induced into the interior body material with a vibrating instrument located on an external surface zone of the body. Appropriate pulse energy, at magnitudes and repetition rates adapted for the particular work body shape and material is applied for plasticizing and reforming resident normally solid interior body material. Such applied energy relates to product shape and utilities and product materials. Thus required energy and pulse repetition rates vary significantly between different metals such as bronze and steel and between metal and plastic bodies, for example. Compressive pulse energy waves induced inside the body relaxes and redistributes residual crystalline structure and product material character to reduce work product voids or bubbles and rework grain structure and residual stress patterns to reform the solid body material structure. The molten or plastic condition, typically serves to relax residual stresses, remove voids and improve grain structure. This improved structure is retained by rapid cooling of the molten material in place achieved simply by withdrawal of the pulse vibration energy.

Controlled and consistently reproducible scientific interior product body restructuring is achieved by this invention which permits adoption of product control conditions and automated procedures for achieving stated objective results, including creation of substantially grainless white layers and relaxing resident internal stress patterns. With this scientific method improved products with longer life spans bearing heavier loads can be produced, maintained and repaired at significantly reduced costs.

Thus, internal product work body conditions are sensed during dynamic treatment to provide feedback signals for controlling and automating the treatment process. Feedback signals are obtained from electrodes located upon the vibrating transducer for electronically sensing the transducer interface loading conditions during dynamic changes in the product body interior structure thereby providing intelligence for control of the effectiveness of the treating process and automating it.

A work product body is treated by the forced driving pulse vibrations induced by an ultrasonic transducer and indenter impact needle at the body exterior surface. Rapid dynamic changes of the internal body material characteristics occur to mismatch the natural vibration frequency of the transducer and the mechanical vibration frequency of the treated body during the treatment procedure. This not only significantly reduces the efficiency of energy transmitted into the treated body, but also significantly jeopardizes the predictable quality of the work product which is processed accordingly under unknown conditions.

There are encountered dynamic changes in surface conditions, internal deflection modes, residual and dynamic stresses within the material structure, which heretofore have not been ascertainable or controllable.

Accordingly this invention by sensing the ultrasonic tool interface conditions with the work product external surface produces a feedback signal indicative of the dynamic state of the body under treatment. For example plasticized or molten metal behaves differently from cold metal, and residual internal stress patterns produce different product characteristics.

The ultrasonic transducer itself by means of carried electrical contact probes thus simply serves as a feedback detector reproducing transducer striction waveforms during the dynamic treatment of the work product. The resulting feedback electric signal then may be analyzed to determine the internal body structure dynamic state and used thereby to maintain a predictable and repeatable product quality level. For example, the efficiency of the ultrasonic treatment in transferring available pulse energy into the work product interior is critical.

The feedback signal of the transducer under forced vibration in contact with the vibrating body surface then will for example produce a periodic waveform pattern representative of the stroke magnitude and the mechanical vibrating frequency at the surface interface. This signal may be periodically be sampled during pauses in the driving oscillation force to the transducer to produce the mechanical resonance frequency and phase. Thus the transducer driving oscillator may be adjusted to the mechanical resonance frequency to significantly increase the transfer of energy by utilization of the tuned circuit Q amplification factor.

This feedback sensing technology is applicable to controlled treatment of a wide range of product body interior structures, including plastic, metallic, ferromagnetic, welded and weldfree work products, resulting in more consistent quality of treated products. Other feedback control signal characteristics are typically useful to control timing of the molten phase and the cooling phase for creating an annealed steel product of particular advantages for example.

Thus, for example, any load bearing work product structure, where the load is compression, tension, thermal or abrasive, can be treated to produce a modified internal body structure that meets the product objectives of longer life and greater load bearing capacity.

Consider for example a ferromagnetic railway brake shoe product braking surface, which is subjected to both compressive load and significant thermal stresses. The treatment method of this invention on the braking surface can produce a stronger, longer life product by processing the interior body structure to remove voids, stress concentrators and restructure as if by annealing the grain structure to produce a longer life white layer surface in the brake surface contact area.

A welded product structure is particularly adapted for treatment by the methodology of this invention to also produce improved product functionality. The stress concentrations at a weld joint between the weld seam and the interior product body structure may be effectively treated to relax stresses, remove voids and produce favorable residual interior stress patterns when cooled in place after thermal treatment.

Furthermore in creating the initial weld seam in the product manufacturing phase, this invention provides automated manufacturing instrumentation, procedures and systems for controlling welding quality and producing a stronger and longer life product. The technique may also be employed during the service life for maintenance to reduce aging and loading fatigue and for repair of visible failures such as bending or striated and cracked surfaces. Accordingly welding technology represents a preferred vehicle for embodiment of various features and innovations afforded by this invention. The improved products, instrumentation and systems afforded by this invention are thus implicitly interwoven in the following embodiments of the invention.

Thus, in accordance with a preferred embodiment of this invention, an ultrasonic impact technology (UIT) surface impact treatment step creates states of plasticity in the inner body structure by way of applied pulsed compressive stress energy. Thus, residual stresses are relaxed and reworked stress gradient patterns result in more effective distribution of internal stress patterns to significantly strengthen the body for its work function. The resulting effect of UIT treatment generally creates a rearrangement submicrostructure of grains in treated areas, particularly in ferromagnetic metals.

More specifically internal structural defects, such as vacancies and grain dislocations, are exposed and moved to the boundaries of modified grain structures such as encountered at weld seams, for example, resulting in annihilation of gradients of structural strain of 2nd and 3rd types in the vicinity of these boundaries. In addition, strain redistribution and reduction of the 1st type strain are introduced in the treated zones, typically encompassing welded joints. This results in welded products with longer life and higher load bearing capacity. Such UIT treatment steps are useful during welding, fabrication of new structures, maintenance operations, and/or treatments of aging, stress fatigue or catastrophic failure to restore life.

In the technical operation of repair of a crack visible on the external surface of a metallic body, the invention is characterized by the basic method steps of UIT treatment supplemented by the mechanical deformation steps of chamfering sharp edges about the crack, drilling holes at crack end points to prevent further spread, and the welding of bracing structure onto the welded product as a further bypass vehicle for bearing load, relaxing internal residual stress defects and favorably influencing dynamics to prevent crack formation and development.

During practical defect repairs in a welded structure, UIT permits the structure to be maintained without interruption of its use (typically bridge support girders over which normal traffic flows) in all phases of maintenance and repair by such procedures as:

(a) repair of deep cracks and full penetration cracks by re-welding and UIT treatment;

(b) repair of shallower surface cracks and defects of structural metal, such as fatigue corrosion defects, by applying UIT treatment to these defects and adjacent areas;

(c) stopping crack development by drilling holes at ends of cracks and chamfering those holes, adjacent zones and hole surfaces with UIT and;

(d) prevention of crack formation or spread by UIT treatment to redistribute stress concentration patterns.

Each of the above steps of structure maintenance comprises sets of operations which in combination result in high quality and reliability of a welded structure. The individual operational steps in these multi-step processes for welded products which are eliminated typically include:

(i) grinding and sanding of surfaces for preparing for welding, drilling and painting;

(ii) mechanical treatment of weldments in order to eliminate stress concentrators;

(iii) mechanical treatment of weldments to remove irregularities of welding joints;

(iv) relaxation of residual welding stresses;

(v) intermediate cleaning of beads from flux, calx and other impurities;

(vi) demagnetizing of welding pass in multi-pass welding procedure; and (vii) creation of compression stresses for prevention of structural damages of material under normal loading.

Thus, this invention provides simplified procedures that replace a number of conventional procedures, and which is less dependent upon uncontrollable variables in equipment, worker's qualifications, etc.

In a typical embodiment of the invention, (i) a UIT transducer working head is located on the surface of a welded work product in a zone residing at a predetermined distance from an applied electric welding arc, lazer beam or other welding torch method in a region having a temperature considerably cooler than the welding temperature.

(ii) In this relationship, the ultrasonic transducer head is caused mechanically to concurrently track by means of appropriate instrumentation a desired surface pattern related to the path of the welding arc. This accordingly creates along the weld seam, as well as in front and/or beyond the weld seam up to the welding arc zone, an internal compression wave pattern which penetrates the welding zone and/or the welded product body far enough and deep enough to reform residual stress patterns within the product body during the welding step.

Introduction of UIT at the actual time of welding results in moving ultrasonic waves through the welding joint and into a molten welding pool. This optimizes the process of welding joint formation and provides its high quality and uniformity in the final structure. The basis for this process is ultrasonic cavitation of the molten metal and acoustic flow which in turn induces ultrasonic outgassing, grain dissipation during its crystallization and optimization of thermal-mass exchange in the welding pool.

Other objects, features and advantages of the invention will be found throughout the following description and claims.

BRIEF DESCRIPTION OF THE DRAWINGS

In the accompanying drawings, wherein like reference characters indicate related features throughout the various views:

FIG. 1 is a block diagram representation of a system embodiment of this invention for ultrasonic impact treatment of welding seams or joints and adjacent product structure prior to, in the process and after welding;

FIG. 2 is a hypothetical waveform sketch illustrative of the possible manner of distribution of compressive stress waves in the body of a welded product being treated by ultrasonic impact;

FIG. 3 is a diagrammatic sketch in plan view of a crack formed in a welded product surface having holes drilled near the ends of the crack to reduce the tendency of the crack to enlarge;

FIG. 4 is a cross section side view in a section designating a preferred area of application of ultrasonic impact treatment of edges of a chamfer and a hole surface in order to stop cracks from propagating away from the hole drilled at an end of the crack looking into lines 4—4 of FIG. 3;

FIG. 4A is a top view of the FIG. 4 configuration showing the insertion of a plug into the hole after chamfering of the surface edges of the hole, ready to be followed by UIT of the region about the hole, chamfer, and accompanying crack;

FIG. 5 is a diagrammatic side view looking into a crack, as if looking into an air gap positioned in a welded product body between crack walls;

FIG. 6 is a diagrammatic plan view of a fragment of a welded body such as a bridge girder panel with an upper flange welded thereon, which displays a crack in the panel, and the nature of one repair embodiment made to the welded body in accordance with the teachings of this invention;

FIG. 7 is a normally disposed diagrammatic end view looking into the left end of FIG. 6;

FIG. 8 is a diagrammatic showing of typical types of peen impact upon a treated surface as induced by various needles powered by ultrasonic transducers;

FIG. 9 is a waveform diagram illustrating dynamic conditions encountered at a work face surface of an ultrasonic transducer;

FIG. 10 is a block circuit diagram of a feedback system for matching the frequency and phase of the transducer oscillator driving source to the resonant frequency of the loaded transducer;

FIG. 11 is a waveform diagram showing a periodically controlled waveform train for maximizing energy transfer to a transducer in working contact with an interface surface of a welded structure illustrating driving pauses during which feedback signals are sampled;

FIG. 12 is a sketch of a universal joint mechanical rig for scanning a UIT instrument over a path on the exterior surface of a work product;

THE PREFERRED EMBODIMENTS

Figure 13:
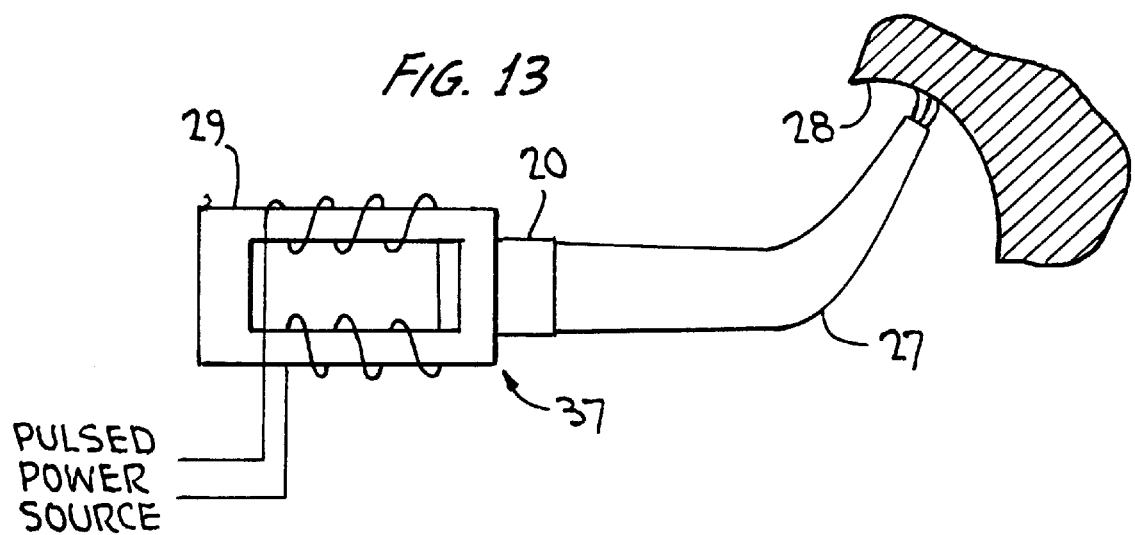
FIG. 13 is a schematic configuration of a vibrating instrument head coupled by a waveguide to a treatment surface.

In FIG. 1 it is seen that a weld seam 16 is being laid down on the welded product body 15 surface at the representative welding arc 17, which is moving to the left as indicated by arrow 18. Appropriate arc energy is derived from the current source 19 for this welding embodiment. In accordance with this invention, an ultrasonic transducer head 20, powered from the ultrasonic energy source 21 is moved along the weld seam 16 in tandem with the arc in direction 18, as indicated by the dotted line 22.

As seen from the surface scanning universal positioning mechanism jig tool 23 of FIG. 12, the ultrasonic transducer head 20 may be manually or automatically moved in a desired scanning pattern 24 over the exterior body surface, such as by use of an intermediate pantograph following a predetermined scanning pattern or an automated machine tool program producing step by step movement along a specified path (not shown). The transducer may have multiple head structure 20, as depicted, or other forms to adapt to special surface and energy magnitude conditions, such as knife edge or rectangular configurations having appropriate contact surface areas.

In FIG. 13, it is seen that the transducer head 20, driven by transformer 29, is coupled to a suitable power oscillator source. The output vibrations may be transmitted by special instrumentation such as a waveguide 27 for conveying the impulse energy without significant losses to impact curved surface structure 28 or hard to reach positions in a welded structure such as a bridge support girder.

Figure 14:
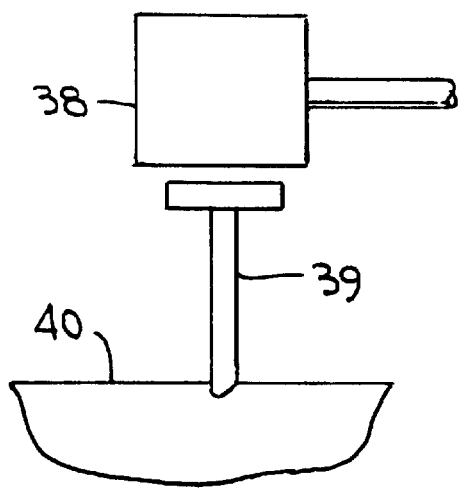
FIG. 14 is a diagrammatic view of a preferred energy coupling method embodiment of this invention.

In the region 37 where the transducer vibrator mechanism impacts the waveguide 27 there are optional coupling methods. In accordance with this invention, much greater power transfer to the treated surface is effected by the method illustrated by FIG. 14. In this respect an analogy is made to a hammer 38 striking a nail 39 in firm contact with the surface of the body 40 being treated. This is the double sided impact method DSI, later discussed with reference to FIG. 8, which is preferred because of the substantially increased efficiency of energy transfer in compressive wave energy form into the interior structure of the body 40.

The frequency and magnitude of the applied ultrasonic energy is induced into a welded product body, and selected in such way as to provide nondestructive contact with a surface of a welded product body, such as 15 in FIG. 1, to induce compressive stresses on this surface for conveyance into the interior work product body structure 15. The stresses in particular are not less than the maximum yield of the base material and at the depth not less than 1 mm, for exciting in the body of the welded product, typically at the depth not less than 5 mm, ultrasonic compression waves with amplitudes of periodically alternating strokes to produce not less than 0.1 of maximum yield, thus for transport into a welding pool without substantial mechanical deformation or removal of material from the exterior surface. At the arc 17 there is a high temperature, typically around 900 degrees C., and a substantially cooler residual temperature, typically up to 450 degrees C., prevailing at the transducer head 20.

FIG. 2 demonstrates a theoretical ultrasonic stress wave, which is in accordance with this invention, induced in the body 15 of the treated product to encompass an interior area of plastic deformation. Thus, compressive stresses on the surface of the treated product 15, typically near a welding seam joint, including its seam line, are produced under a condition of minimum deformation of the treated body surface. Near the treated surface impact point of the body 15, compression stresses and ultrasonic deflection or oscillation amplitude are maximized, and recede at a gradual gradient to the base point 26 located in an unmodified region of the body under treatment at a distance internally spaced from the initial impact point.

At the "base point" 26 the body material structure corresponds to its initial condition before treatment. Between the treated surface and point 26, only during dynamic UIT treatment, gradients of compression and alternating ultrasonic compression waves are temporarily formed, which lead to relaxation and redistribution of residual stress patterns, such as air pockets, grain boundaries, fatigue stress conditions, etc., to permit preservation of redistributed stress patterns in the body material after UIT treatment is withdrawn.

During internal plastic deformation of the body structure by creation on its surface of residual compressive stresses, stress compression waves are induced inside the body 15 as created by the external impact pulses, preferably periodic ultrasonic pulses. Thus, in a way similar to that described in Leftheris, U.S. Pat. No. 3,961,739, supra, internal stresses in the treatment zone are relaxed and redistributed. In the surface area of plastic deformation under a very high velocity of pulsed ultrasonic deformation, local heating to very high temperatures (for annealing) at the impact point location of the treatment tool occur with rapid thermal dissipation into locations spaced from this point. This under controlled conditions results in a modified grain structure, commonly visible in the cross section of a metal, which has almost amorphous submicroblock structure, known as a "white layer". It has high contact strength with high corrosion and fatigue resistance.

Several known types of impacts initiated by ultrasonic transducer oscillations are shown diagrammatically in FIG. 8. Thus impact occurs in the following modes:

simultaneous contact of an indenter 70, 71, 72 (impacting needle, impacting element, peen, etc.) with the working surface of an output butt of an ultrasonic transducer 73, 74, 75 and a treated surface 76 termed—double-sided impact (DSI);

the indenter 71 only in contact with a treated surface 76 termed—one-sided impact (OSI); and the indenter 73 in contact with the working output butt of an ultrasonic transducer 75 only—also termed one-sided impact (OSI).

These impacts, as a rule, are of a nature that comprise both single random impacts on treated surfaces and/or the periodically applied pulse output from the working butt of a mechanically oscillating ultrasonic transducer. The spectrum of these pulses is in the range, which is two orders of magnitude lower than the frequency of forced initiating impact oscillations of an ultrasonic transducer.

From the point of view of optimal energy transfer, the most useful of these impacts are the DSI types. Unfortunately, their low repetition rate (frequency of impact), single moment character of impact (without filling the impact with higher frequency oscillations) and low energy transfer of single impacts do not permit utilization of the full energy of an ultrasonic transducer in the prior art during UIT treatment. The prior art utilization energy efficiency of a transducer in this case usually is not more than 5%.

However, the present invention increases the transducer efficiency by:

matching at the impact interface surface 76 of mass, form and frequency of the vibrating driven frequency of an ultrasonic transducer 73, 74, 75 and the mechanical vibrations induced in the treated surface 76. Thus for a DSI simple pulse impact at the output working butt of an ultrasonic transducer 73, the related forced oscillation conditions, encountered at the interface 76 are shown in FIG. 9. When the double-sided impact is realized as indicated in region 80, ultrasonic forced oscillations from the indenter impact with the treated material occur in the material at the impulse magnitude or amplitude of thrust 83 induced at resonant frequency when the thrust amplitude is amplified by the Q factor of the resonant body.

The random (stochastic) force of DSI pulses on treated surfaces, as shown on FIG. 8 do not alone fully utilize the energy of a transducer during the UIT process, but substantially doubles the prior 5% efficiency of transfer of impulse energy into the interior body of the work product.

The waveform at the ultrasound oscillating frequency of the transducer is initiated at the ordinate, which represents oscillation amplitude in micrometers. The abscissa represents time in microseconds. The startup region 81 achieves forced oscillation in the transducer in region 82 at the designated amplitude of transducer vibration. Upon pulsed impact at the external body surface, the higher amplitude envelope 83 is encountered at a given resonance condition. In the DSI mode of operation thus, the oscillation frequency and phase of the forced transducer oscillations, as provided by a driving power oscillator, is preferably tuned to the resonant mechanical frequency of the transducer and work product during dynamic work contact with the treatment surface, thereby to in effect produce a high Q resonant condition shown with amplified impulse strokes attained within the circle 83. When the transducer is withdrawn from the surface, the transducer oscillates at the amplitude shown in the gaps 82, 84. However, when the OSI mode is in effect a pause in the needle contact condition permits the shorter impact period 85 to exhibit the mechanical resonant condition of the vibrating work product surface without contact.

Of importance to this present invention is that this condition produces a feedback signal 86 from the transducer, typically of a full cycle between zero crossing points. This feedback signal is used as shown in the FIG. 10 embodiment to correct the frequency and phase of a controlled driving oscillator to conform to the loaded transducer resonant frequency, thus significantly increasing the power transfer efficiency of a compression wave interfacing system. Thus, all dynamic variations of the plasticized work body interior structure are tracked by an automated feedback system employing transducer mounted electrodes reproducing electric signals in the phase and frequency of the mechanical contact vibration mode.

In FIG. 10, the periodic pulse energy source 88, typically a power oscillator or a gated power impulse system, drives the transducer 89 periodically at a nominal frequency that approximates the loaded transducer resonant frequency when in contact with a work site surface. However, this dynamically induced resonant frequency varies with the texture and state of the internal work body material structure, which dynamically changes with the temperature and other known and unknown variables in the work product interior. In accordance with this invention, the feedback voltage signal (85, FIG. 9) appearing following the single impulse 80, 83 then is processed by the frequency and phase control system 90 to dynamically adjust the periodic pulse energy source 88 frequency and phase to the optimum working resonance frequency of the transducer in working relationship with the work surface 79, as interpreted by the detected feedback sample 85, by way of peen or needle 91.

This feedback signal implicitly accounts for various dynamic variations of the internal work product body condition serving as a working load on the transducer, including such complex interactions as temperature changes, different internal structure patterns such as variations of plasticity and encountered grain structure, etc. to produce instantaneous corrections for matching the pulsed energy frequency to the mechanical dynamic impedances of the work product interface surface as the work proceeds.

In FIG. 11, the touching circles 83 represent the lower frequency periodic controlled pulsed energy stroke shapes and amplitudes of the transducer induced impact on the work product interface modulated onto higher frequency ultrasonic transducer drive pulses during periodic or controlled nearly periodic impact cycles of the transducer. The frequency shapes and magnitudes of applied pulses are chosen to match the particular work function and work products being processed. In the gap in the drive pulses introduced at the latter part 86 of each lower frequency impact pulse 83, 87, etc., an electronic feedback signal measurement is taken identifying the mechanical frequency and phase at the interface without influence of the driven transducer. This is employed as aforesaid for correcting impulse frequency and phase of the power oscillator driving pulses to the transducer to thereby restart (81) and control the next lower frequency impact driving pulse cycle 87 in matching transducer resonance with the natural mechanical resonance frequency at the work contact surface for each succeeding impact pulse. This produces a maximized energy efficiency in the use of the loaded transducer to substantially improve prior art driving effectiveness in UIT treatment of work products. Also this provides sensed intelligence related to the instantaneous dynamic conditions of the work product interior structure that permits controlled treatment of work products by way of such dependent automated systems as that of FIG. 10.

The forced oscillations, at the discrimination driving level 92, by the resonance process depend upon the matching mechanical resonant circuit Q to produce by a driven, loaded transducer having a matching resonant frequency, produces much higher amplitude transducer strokes at the readjusted natural transistor resonance frequency 93 for each succeeding impact stroke to improve pulse energy transfer into the work product body. The periodic start-restart cycle is chosen at a controlled, near periodic rate suited to the internal work product structure and the system treatment environment accounting for dynamic rates of change therein of the temperatures, liquid or plastic product phase, structure surface and peen interface characteristics, etc. encountered in the UIT treatment process.

Utilization of this procedure at a work product interface produces pulsed impacts of higher energy thereby inducing greater load bearing capacity and greater resistance to fatigue encountered during the service life of the work product. Furthermore the procedure provides a technique that is not only useful in the production phase of new products, but also is applicable for maintenance while in service to remove residual stresses tending to cause acceleration of structure fatigue and aging. The method, thus, helps to restore and improve the load bearing capacity of the work product, for example welded structures. In addition, should catastrophic failures such as cracks or fractures develop in a welded product structure, this procedure provides a tool to repair in situ a welded product requiring greater impact energy efficiencies such as a bridge strut or girder, in the process afforded by this invention to restore the work product to new life, usually with improved strength and fatigue life, feasibly while the structure is in normal use.

Thus, this invention introduces to the art of fabrication and maintenance of work products including welded structures the non-destructive, non-indentation method of treating the product to increase its fatigue life and loading bearing strength by utilization of a minimum number of steps or technical operations, typically for a welded product embodiment:

for inducing pulse impact energy non-destructively at the exterior surface of a welded product in the vicinity of a seam being welded at a site on the welded product exterior surface where the temperature is substantially cooler than molten metal, preferably employing ultrasonic controlled, nearly periodic impact energy of a frequency and magnitude inducing a temporary plasticity zone internally in the metal product as induced by internal compression wave patterns near to and inclusive of the welded seam junction thereby to rearrange internal crystalline structure of the welded metal product to produce a patterned grain structure about the weld seam junction with the product internal structure which constitutes a substantially grainless white layer leading into a gradually receding stress gradient pattern reaching an unmodified inner base point of the workpiece.

Thus, control of impact parameters during UIT allows one:

to provide effective input and utilization of ultrasonic transducer energy by a method, which maintains and optimizes the condition of treated surfaces;

to introduce ultrasonic energy directly into the welding process in the area of temperatures substantially lower than the melting temperature of metal in a pool at a prescribed distance from the welding pool sufficient to increase the quality of a welding joint interface;

to achieve conversion of the structure into a corresponding "white layer" by relaxation and/or redistribution of residual welding stresses thereby to increase load bearing capacity of a structure, and to increase fatigue life of welded joints and structure by creation of normalized gradients of compression stresses in the surface layer of treated structure material using controlled force pulses and inducing internal ultrasonic strain waves with amplitudes diminishing between a surface impact site and an internal "base point" at which the strain waves do not alter the original material structure; and to sense at the transducer the conditions encountered during dynamic workpiece treatment for automatic control of treatment parameters.

Typically a resulting white layer metallic grain structure gradient is observable at depths of 100 micrometers from the external surfaces abutting a zone of redistributed and relaxed residual stress patterns typically to depths of 3 to 12 mm. This substantially decreases internal residual micro-stress patterns such as tend to concentrate at grain boundaries and thus eliminates significant grain boundary stress center micro-defects over the residual gradient range of compressive stress patterns which remain in the workpiece metal after the ultrasonic wave energy is removed and the associated temporary plastic state is terminated.

In this manner illustrated by the aforesaid embodiment, this invention provides a novel method of treating a welded metal product or other work body during the initial fabrication process to increase its load bearing life and strength. Other advantages, features and embodiments are hereinafter suggested in preferred embodiments of the invention.

Now by reference to FIGS. 3–5, it will be seen that this invention also encompasses novel methods of repairing catastrophic failures such as fractures or cracks in welded products and other work products. The nature of such repair methods enable in-situ repairs in some sites as in bridge struts or girders while the bridge remains in active service, with continuous traffic flow over the bridge feasible. Furthermore the following repair methods, with little labor cost and modification of surface shape of the welded product uses a minimum of specialty tooling, and are instrumental in relaxing the internal residual stresses tending to form cracks by creation of plastic deformation zones to introduce enhanced strength properties. This reduces risk of damage to the microstructure of product material exhibiting internal and external stresses and rather forms favorable compression stress patterns in regions near a zone of potential crack formation such as generally found along the welding seam junctions. The redistribution of gradient stress patterns extending from weld seams into the base metal thereby reduces external and internal stresses at the welded joints and makes the internal body structure more uniform while reducing or preventing possibilities of further crack development and fatigue failure thereby to produce increased post-treatment utility life. By further removal of metal along the crack to remove and relax stress concentration regions along the weld seam additional extensions of renewed life expectancy and reduced fatigue is also achieved.

Additional improvements are achieved in various sequences of technological operations in the repair process such as (i) the application of ultrasonic impact energy together with welding steps and/or (ii) structural alterations of the type hereinafter discussed. The welded product or structure fragment 15, has appearing therein a fatigue crack 30 with holes 31 drilled at the ends for the purpose of reducing the likelihood of spread or further development of the crack. The chamfered bevels about the top and bottom edges of the holes 31 for removing stress patterns that tend to accumulate at the otherwise sharp edges, are bevelled preferably by ultrasonic impact treatment delivered through a suitable ultrasonic transducer head to optimize structural alteration of the welded structure 15. Positive compression stresses induced by UIT treatment at chamfered bevels and in the hole itself compensate tensile alternating stresses, which are present in the structure during its loading and which lead to its fatigue, first of all in the zones of stress pattern concentrations. Thus, when UIT is used at bevels of holes and at the end of cracks, the fatigue life is disproportionately improved.

Otherwise in general the ultrasonic force pulses are applied non-destructively to the surface of the welded body or structure and cause plastic metal deformation of the structure's interior material and thought this plasticity zone excite in the structure ultrasonic oscillations and compression waves of ultrasonic energy. In this embodiment the area of protection from fatigue damage is within the top and bottom surface zones of UIT influence (33) that identify the critical region at the ends of cracks in which the relaxed stress patterns can be achieved to better assure that no further cracking will develop. Thus, UIT induced compression stresses, relax and reconfigure residual internal and external stress patterns that result in cracking. The resulting mode of deformation in the presence of "white layer" structure on or under the surfaces 31, 32 and 33, directly increases the life and strength of welded product 15.

As seen from FIG. 4A, an internal metallic plug 34 is inserted loosely into the hole 31 after chamfering the beveled edges 32. Similarly any exposed sharp edges 35, 36 along the crack 30 are beveled by UIT to reduce stress concentration zones in the repaired product. The plug is utilized as an ultrasound wave guide to apply ultrasonic energy to internal surfaces of the hole for stress relief treatment.

In FIG. 5, the diameter of plug 34, shown as a, provides the tolerances delta within the limits of the hole size. The dimension Dmin represents that the drilled holes 31 have the smallest feasible diameter that assures prevention of the spread of the crack. This avoids excessive weakening of the welded structure.

The crack may alternatively be welded and the welding joints treated by the ultrasonic impact treatment in the manner aforesaid.

In FIGS. 6 and 7, the welded product structure typifies for example a bridge girder or strut in which the region about the repaired crack 30 in girder plate 60 is fortified by structural alteration in the form of a stiffener 61 with a gap near the upper flange 63 installed after crack initiation is arrested with use of UIT technologies and drilling of holes, or with UIT treatment after grinding or rewelding of a crack.

In this embodiment, the strengthener or stiffener plate 61 is welded onto girder plate 60 at the weld seams 62, which at the upper end are adjacent the crack 30. The top flange 63 is welded to the girder plate at seam 64. The UIT tool 69, as shown applied to an exterior surface near weld seam 64, may be a manually manipulated instrument coupled to a suitable ultrasonic energy source. The heavy lines notation 65, 66 indicate the path pattern for application of the ultrasonic impact treatment in the aforesaid manner to create internal compression wave patterns and to de-concentrate, relax and redistribute residual internal stresses about the weld seams 62, 64. Thus it is seen that in the plate 60 both upper and lower sides of the repaired crack, in the area of welding joints 62, 64 present welded metal. The area of gaps between the flange 63 and plate 61 is subjected to impact treatment in order to repair fatigue defects, and to create a positive gradient of strain of the 1st, 2nd and 3rd rate in order to relax residual welding stresses, and to create a compression stress zone. As a result, these structural changes in material create under the disclosed conditions, the more stable structure of a "white layer" in areas of welding joints, by way of the UIT treatment.

It is further to be recognized that the technological operations provided by this invention are useful for preventive maintenance during the useful life of welded products to remove fatigue stress defects and to generate white layers of higher strength about weld sites.

Typical ultrasonic generators useful in the methodology of this invention are 200 to 1600 watts, 25–28 kHz generators (ranging from 18 to 55 kHz) producing an oscillation amplitude at the wave guide edge, for example, of 25–40 mkm at the frequency of 25–28 kHz at the treatment mode speed of 0.3–0.7 m/min with a manual impact tool. This manual impact tool, with a magnetostriction transducer head, typically has a set of four striking needles in the manner shown in FIG. 8. Also automatic and/or robotic tools can implement the described UIT process. Other tool heads are applicable having one striking needle to several needles placed in appropriate rows, or alternatively, knife or rectangular impact surfaces, etc., depending on a task and size of the treatment area.

Typical residual compressive stresses in the surface layer of high strength steel reach 500 MPa to 900 MPa. The ultrasonically cold worked layer in which the distribution of residual stresses occurs reaches typically a depth up to nearly 1.5 mm but can reach 3 mm for compression stress and 4–12 mm for relaxation or redistribution of residual welding stress patterns.

It is to be realized however, that the methods of this invention are applicable to many kinds of welded and unwelded products varying in shape, strength and types of utility, and those skilled in the ultrasonic arts can therefore establish the necessary parameters and instruments for carrying out the purposes of the invention.

Having therefore advanced the state of the art, those features of novelty setting forth the nature and spirit of the invention are defined with particularity in the appended claims.

What is claimed is:

1. An ultrasonic method of treatment of a work product material for improving life and load bearing strength, comprising the steps of:

applying impulses to an external surface area in the vicinity of stress concentration regions of said work product material by an impulse producing instrument presenting at least one needle-shaped indenter in mechanical contact with the external surface area to deliver a multiplicity of shock pulses of a frequency, magnitude and sequential relationship to induce increased temperatures to a predetermined depth in the work product material that produces internal compression waves in a dynamic treatment zone of the work product material to relax residual stresses, inducing by reaction to said shock pulses in said dynamic treatment zone a compression wave pattern gradient of greater magnitude at a surface area than at remote locations in the work product material, and withdrawing the shock pulses in a manner that substantially cools the treatment zone to establish reconstructed compression wave distribution patterns thereby producing a work product material with higher fatigue strength and load bearing capacity.

2. The method of claim 1 wherein the work product material is a welded product with stress concentration regions in the vicinity of a weld seam and said method further comprises subjecting the work product material at said stress concentration regions in the vicinity of the weld seam to said shock pulses in such a manner to produce plastic surface deformation in response to said shock pulses.

3. The method of claim 1 wherein relaxed internal stress patterns are established in residual work product material structure in said treatment zone.

4. The method of claim 1 further comprising producing the shock pulses in a manner establishing a white layer effect in residual work product material structure.

5. The method of claim 1 wherein the impulse producing instrument establishes a gradient pattern of internal vibrations extending from a maximum vibration amplitude near the external surface area being treated to merge into remote locations of substantially unvibrating body material, and wherein the step of withdrawing the shock pulses is executed in a manner that substantially cools the treatment zone and is achieved by movement of the impulse producing instrument in a path over the external surface of the work product material.

6. The method of claim 1 undertaken by withdrawing the shock pulses at a rate producing a manufactured product body having fewer voids in said dynamic treatment zone.

7. The method of claim 1 wherein the shock pulses are withdrawn at a rate that relaxes residual internal product body stress patterns induced by aging and fatigue conditions in the work product material.

8. The method of claim 1 wherein visible aging and fatigue defects are observable on the work product material and said method further comprises subjecting said defects to said impulses to repair the defects.

9. The method of claim 8 wherein the work product material is in a product which is a load bearing member in a bridge structure, and wherein the method is undertaken with traffic moving over the bridge structure.

10. The method of claim 1 wherein the shock pulses are applied to said external surface area on an untreated work product surface without preliminary surface treatment.

11. The method of claim 1 undertaken on a product with a metallic body.

12. The method of claim 1 undertaken on a ferromagnetic body material.

13. The method of claim 1 wherein the work product material has a weld seam and the shock pulses are applied alongside the weld seam to create the internal compression waves at a weld seam interface region.

14. The method of claim 1 further comprising moving the impulse producing instrument over a path configuration on said external surface area.

15. The method of claim 14 further comprising concurrently moving a welding device over a corresponding path on said external surface area to produce an area of relaxed residual stresses which merges with the zone induced by said internal compression waves.

16. The method of claim 14 further comprising the step of moving the instrument along said path with a positioning mechanism jig.

17. The method of claim 1 wherein the internal compression waves are ultrasonically induced.

18. The method of claim 1 wherein the step of withdrawing the shock pulses comprises moving said impulse producing instrument on the external surface area away from said treatment zone.

19. The method of claim 18 further comprising generating said shock pulses at a driving frequency of 18 to 25 kHz during movement of the impulse producing instrument along the external surface area at a treatment mode speed of 0.3 to 0.7 m/min.

20. The method of claim 18 further comprising automating movement of said instrument away from the treatment zone in a step by step movement mode.

21. The method defined in claim 1 wherein said impulse producing instrument comprises a peen freely moving between an impulse producing implement and said external surface area to contact said external surface area in free flight for delivering impact impulse blows at a peen interface junction on said external surface area.

22. The method of claim 1 further comprising creating the shock pulses with an impact producing instrument comprising a transducer driven at a controllable oscillating frequency in contact with the external surface area of said work product material, driving the transducer into an oscillating mode with a periodic source of pulse energy at a frequency corresponding to a natural mechanical resonance condition of the instrument at work on the external surface area, periodically detecting a feedback signal at an interface of the instrument showing frequency and phase of a natural mechanical oscillating frequency, and adjusting the controllable oscillating frequency and phase to that of the sampled mechanical resonance condition.

23. The method of claim 1 wherein the impulse producing instrument comprises a transducer displaying a resonant drive frequency during work on the work product material, applying said shock pulses periodically at the resonant drive frequency, utilizing a feedback signal from the transducer to correct the frequency and phase of the drive frequency to the transfer resonant drive frequency and phase, thereby to effectively transfer ultrasonic energy from the transducer into the work product material interior.

24. The method of claim 1 further comprising applying said shock pulses in a form of pulsed ultrasonic energy with a manually applied ultrasonic transducer impact tool non-destructively contacting said external surface area.

25. The method of claim 1 wherein said method is for treatment of metal products with said work product material being metal, and comprises creating a compressing/compression stress at said external surface area for plasticizing the metal and redistributing stress distribution patterns in internal zones thereby to create internally a substantially grain free white layer zone.

26. The method of claim 1 further characterized by the step of applying the method in an initial welding production stage of a welded body product to produce a welded structure with higher fatigue strength and higher load bearing strength.

27. The method of claim 1 further characterized by the step of applying the method in a maintenance stage in the interim life of a welded structure in service to improve fatigue resistance and fatigue corrosion resistance.

28. The method of claim 1 further characterized by delivering said shock pulses with a manual impact tool in external surface working contact with the welded structure.

29. The method of claim 1 further comprising treating a catastrophic failure region in a welded body structure with ultrasonically reproduced shock pulses to remove stress concentration regions in a welding repair step comprising application of said shock pulses in the vicinity of a weld seam.

30. The method of claim 29, wherein the catastrophic failure comprises a visible crack located on the external surface of the welded body further characterized by the step of mechanically chamfering the lips of the crack and thereafter welding to repair the crack.

31. The method of claim 29 further comprising identifying end regions of a visible crack located on the external surface area of the welded body, and before welding the crack mechanically drilling holes in the end regions of the crack of a minimum diameter which achieves significant reduction in spreading of the crack.

32. The method of claim 31 further characterized by the step of mechanically chamfering surface edges of the holes drilled in the end regions of the crack before welding.

33. The method of claim 29 further characterized by the step of welding on the surface area a bracing member adjacent the crack while applying said shock pulses about a weld seam attaching the bracing member.

34. A method of ultrasonically treating a work product body by mechanical impulse contact of an ultrasonic vibrating instrument comprising at least one needle-shaped peen for contacting an exterior body surface, comprising the steps of:
    driving the peen of the ultrasonic vibrating instrument with a periodic series of ultrasonic driving impulses,
    deriving from vibrations of said instrument responsive to the peen in working contact at a location on said exterior body surface during an interruption in said driving impulses a signal denoting mechanical motion of said exterior body surface at said location, and
    adjusting the periodic driving impulses to conform in frequency and phase with the signal derived.

35. An ultrasonic method of treating internal solid body structure of a load bearing member comprising treating said member with recurring vibrating pulse impacts at an ultrasonic frequency on an exterior surface of a body structure from a vibrating transducer tool comprising at least one needle-shaped peen impact member for delivering a pulse of a magnitude, pulse length and recurrence rate inducing internal residual compressive waves and-plastic deformations in a zone inside said solid body structure leading to relaxation and distribution of residual internal body structural defects, withdrawing pulse impact energy being induced inside said body to return the zone inside the body structure to a reformulated solid state, deriving from operating characteristics of said tool while in a vibrating state a feedback signal indicative of the dynamic internal body state in said zone, and modifying reaction of said pulse impacts on the body structure external surface to more effectively establish said inner solid body reformulated solid state as a function of the feedback signal.

36. A method of reducing structural defects in manufactured work products comprising the steps of:

inducing interior mechanical vibrations in a dynamic treatment step with a vibrating instrument presenting at least one needle-shaped peen member for contacting an external surface zone of a work product and driven with mechanical impulses of an energy, pulse shape, magnitude and ultrasonic repetition rate sufficient to reform resident normally solid interior work body material, sensing interface loading conditions at said external surface zone during dynamic treatment to determine changes in internal body structure, controlling at least one of the energy, magnitude, pulse shape and repetition rate of mechanical vibrations at the surface zone in response to sensed changes of internal body structure, establishing from said mechanical vibrations a plasticized internal body structure condition, and withdrawing the mechanical vibrations in a manner which reestablishes a modified interior solid body material structure.

37. The method of claim 36 further comprising automatically coordinating the step of controlling the energy and timing of the mechanical vibrations in a manner which establishes a modified terminal residual interior body material structure.

* * * * *